Patented Sept. 8, 1925.

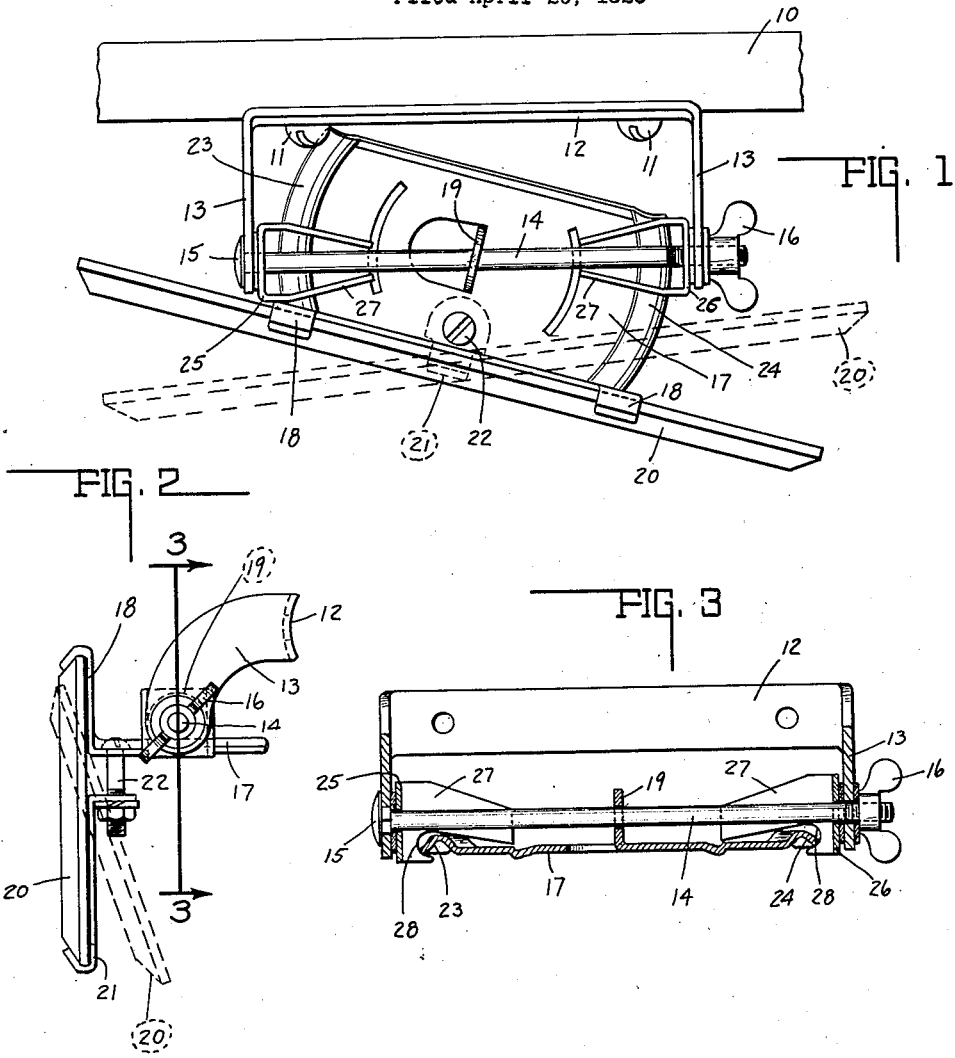

1,552,634

UNITED STATES PATENT OFFICE.

ROBERT F. MILLER, OF INDIANAPOLIS, INDIANA, ASSIGNOR TO PARTS CORPORATION, OF INDIANAPOLIS, INDIANA, A CORPORATION.

BRACKET FOR REARVIEW MIRRORS.

Application filed April 20, 1925. Serial No. 24,593.

*To all whom it may concern:*

Be it known that I, ROBERT F. MILLER, a citizen of the United States, and a resident of Indianapolis, county of Marion, and State of Indiana, have invented a certain new and useful Bracket for Rearview Mirrors; and I do hereby declare that the following is a full, clear, and exact description thereof, reference being had to the accompanying drawings, in which like numerals refer to like parts.

This invention pertains to a bracket for supporting a rear view mirror on the interior of a vehicle for observing the traffic conditions in the rear.

The principal object of the invention is to provide a sturdy bracket structure which will be capable of adjustment both horizontally and vertically. The structure further provides for a comparatively light but rugged device which will minimize vibration if not completely eliminate it, which on many types of brackets of similar structure is objectionable. A further feature in development of this invention lies in the production and cost which enables this structure to have the desired accomplishments while being capable of production at low cost. This is by reason of the fact that the parts embodied in the structure which tend to strengthen it are mere stampings which may be readily assembled.

The full nature of the invention will be understood from the accompanying drawings and the following description and claims:

In the drawings, Figure 1 is a plan view looking down on the bracket showing it positioned in different horizontal adjustments by full and dotted lines. Fig. 2 is an end elevation showing different vertical adjustments of the mirror in full and dotted lines. Fig. 3 is a section taken on the line 3—3 of Fig. 2.

In the drawings there is shown a support 10 for a rear view mirror bracket to which the bracket is adapted to be secured by the screws 11. The bracket comprises a U-shaped support 12 adapted to be secured flush against the support 10 and having outwardly extending spaced arms 13. Said arms are provided with apertures through which a rod 14 may extend, said rod having provided on one end thereof a head 15 and being screw threaded on the other end to receive a wing nut 16. Supported between said arms 13 there is a mirror supporting plate 17 having the mirror clamping arms 18 formed integral therewith. Said plate is provided with an upwardly extending ear 19 through which the rod 14 freely extends so as to act in the nature of a fulcrum about the center of which the supporting bracket 12 and plate 17 may have relative movement both in the vertical and horizontal.

The mirror 20 is clamped against the clamping arms 18 by a clamping arm 21 which is drawn into clamping engagement with respect to the plate 17 through the medium of a screw 22, whereby said mirror is clamped rigidly to the plate 17.

It will be noted that the plate 17 is provided at each end with an arcuate beaded edge shown at 23 and 24, said arcuate edges having their center of curvature located at the fulcrum ear 19.

For the purpose of clamping and securing the plate and mirror in adjusted position with respect to the supporting bracket 12, there is a pair of jaw members 25 and 26 mounted near the ends of the rod 14 adjacent the inner surface of the arms 13 of said bracket. Said jaw members are each provided with a pair of inwardly extending arms 27 embracing the rod and in bearing relation with respect to the plate 17 for the purpose of maintaining them in located position. Each of said arms is formed with an undercut edge clamping portion 28 in position to engage the curved edges 23 and 24 of said plate and be positioned between the edges thereof and the outwardly-extending arm portions 13. The body portion of said members lies between said plate and said arm portion 13.

From the above description of the structure it will be observed that the plate and the mirror carried thereby will be capable of both horizontal and vertical adjustment with respect to the rod 14, with the ear 19 as the fulcrum. With respect to horizontal adjustment, as shown in Fig. 1, the guiding of the horizontal movement, as well as the clamping and securing in adjusted position, will be effected by the engagement of the jaw members with the arcuate edges of the plate. When the wing nut is loosened, the plate will be free to swing horizontally between the jaws, but upon the wing nut being tightened, the jaw members will be forced into clamping engagement with the arcuate edges so as to securely maintain the plate in its adjusted position. With respect to vertical movement, the plate with the associated jaw members and ear 19 will have free adjustment about the rod 14 provided the wing nut is loosened. Upon tightening the wing nut 16, there will be frictional engagement between the arm portions 13 and the adjacent body of the jaw members, whereby they will be frictionally held with the associated plate and mirror against movement. Therefore, when the wing nut 16 is loosened, the mirror may be adjusted to the desired vertical and horizontal positions. By merely tightening the wing nut 16, the plate and mirror will be clamped and securely held against both vertical and horizontal movements.

The invention claimed is:

1. A bracket support for rear view mirrors, comprising a pair of spaced supporting arms, a mirror supporting plate having curved edges adapted to be positioned between said arms, means for connecting said plate with said arms for permitting of its vertical and horizontal adjustment with respect thereto, and clamping members associated with said arms and the curved edges of said plate for guiding the relative movements thereof and clamping the same in adjusted position.

2. A bracket support for rear view mirrors, comprising a pair of spaced supporting arms, a mirror supporting plate having curved edges adapted to be positioned between said arms, a rod for connecting said plate with said arms for permitting of its vertical and horizontal adjustment with respect thereto, and clamping members associated with said arms and the curved edges of said plate for permitting a horizontal sliding movement of said plate and rotation thereof about said rod when in loosened position, and clamping said plate with respect to said arms when in tightened position.

3. A bracket support for rear view mirrors, comprising a pair of spaced supporting arms, a mirror supporting plate having arcuate end edges with their center of curvature substantially at the center thereof, a rod extending between said arms, a pair of jaw members mounted on said rod adjacent the inner surfaces of said arms adapted to engage the arcuate ends of said plate for securing said plate to said arms and permitting a sliding lateral adjustment relative thereto, said jaw members being pivotally mounted in said rod for permitting vertical adjustment of said plate thereon, and means on said rod for drawing said arms and jaw members together against the arcuate ends of said plate for frictionally retaining said bracket in adjusted position.

4. A bracket support for rear view mirrors, comprising a pair of spaced supporting arms, a mirror supporting plate having arcuate end edges with their center of curvature substantially at the center thereof, a rod extending between said arms, a projection formed on said plate through which said rod extends, a pair of jaw members pivotally mounted on said rod so as to embrace the same and provided with cut-out portions for receiving the arcuate ends of said plate for supporting the same in both horizontal and vertical adjustable positions with respect to said arms, and a nut mounted on one end of said rod adapted to screw thereon for drawing said arms together and forcing said jaw-like members inwardly into clamping engagement with said plate and arms for maintaining the same in adjusted position.

In witness whereof, I have hereunto affixed my signature.

ROBERT F. MILLER.